United States Patent Office 3,198,690
Patented Aug. 3, 1965

3,198,690
FOAM RUBBER LAMINATE AND METHOD OF MAKING SAME
Joseph C. Starke, Mishawaka, Ind., assignor to United States Rubber Company, New York, N.Y., a corporation of New Jersey
No Drawing. Filed Nov. 7, 1960, Ser. No. 67,516
8 Claims. (Cl. 161—159)

This invention relates to the use of activated carbon in adhesive cements and a method of laminating absorbent layers by employing such cements.

In my copending application Serial No. 826,132, filed July 10, 1959, now abandoned, I disclosed and claimed the use of activated carbon material in foam rubber compositions, preferably the oil resistant type, to improve the oil retention and wicking properties of these rubbers. Such improved properties make these oil resistant rubbers particularly useful as padding material in journal boxes, i.e., for lubricating the bearings of railway car axle journals.

Those familiar with this art know that the use of previous adhesive cements to bind together two or more layers of rubber, such as an open cell foam rubber, results in the creation of an impermeable barrier of adhesive cement between said layers. Such barrier may present a serious problem in certain foam rubber applications requiring some wicking, such as the application referred to above.

It is the object of my invention to provide an improved vulcanizable rubber adhesive cement which allows and promotes wicking between the interfaces of rubber layers joined by such cement. It is also an object of my invention to provide a simple method of forming rubber laminates by bonding together a plurality of rubber layers with my improved adhesive cement.

These objects and others apparent to those skilled in the art from the following description are accomplished by adding activated carbon material to vulcanizable rubber adhesive cement, thereby providing a cement which is capable of forming continuous bonds between the pluralities of rubber layers (the cement may actually permeate the rubber layers to some extent), and which allows and promotes the migration of fluids through its otherwise fluid-impermeable barrier.

By activated carbon material, I mean activated charcoal from animal or vegetable sources, such as wood, sawdust, peat, lignite, and pulp mill waste. Charcoal prepared from these carbonaceous materials may be activated by several well-known chemical processes, in each of which it is of primary importance to produce a highly pure skeletal carbon having a multitude of very fine pores, called micropores. The high absorptive capacity of the activated carbon material distinguishes it from amorphous carbon forms, such as lamp black and carbon black, the latter finding extensive use as a compounding ingredient for rubber.

I have found that the addition of from 10 to 50 parts by weight of activated carbon per 100 parts of rubber component of adhesive cement is satisfactory. However, through addition of tackifiers and resins this range can be extended by a cement formulator adept in his art. The degree of adhesion required for a particular job appears to be the only limiting factor. The activated carbon, while enhancing the permeability of the adhesive cement, detracts from its adhesion if employed in excess.

The adhesive compositions to which various organic solvents are added to form a cement solution are well known in the art. Such compositions may be comprised of natural rubber, synthetic rubber or latex containing, in most cases, antioxidants, curatives and accelerators admixed with compounds to promote adhesion, including such compounds as are capable of reacting to form synthetic resins which act as cross-linking agents. A rubber latex combined with a phenol, such as resorcinol, and an aldehyde, such as formaldehyde, is an example of this type of adhesive composition. Aromatic isocyanate solutions per se constitute another class of known adhesive compositions. The various types of rubber adhesives are set forth in the De Bruyne and Houwink volume, Adhesion and Adhesives, published in 1951 by Elsevier Publishing Co., at p. 386. However, in the production of rubber laminates for use as lubricator padding, such laminates being low-swelling when contacted with hydrocarbons, cements based on homopolymers of chloro-2-butadiene-1,3 and copolymers of butadiene-1,3 and acrylonitrile are preferred.

While the particular recipes by which the rubber vulcanizable adhesive cements are made do not constitute the instant invention, the recipes set forth in the following examples are suitable for the practice of my invention.

*Example 1*

| Neoprene cement: | Parts by weight |
|---|---|
| Neoprene | 100 |
| Polymerized aromatic hydrocarbon resin | 4 |
| Calcium carbonate | 28.50 |
| Titanium dioxide | 28.50 |
| Calcined magnesia (light) | 3.75 |
| Resin-type curing agent | 1.50 |
| Rosin | 11.50 |
| Accelerator | .55 |
| Zinc oxide | 5.00 |
| Activated carbon | 25.00 |

This cement was employed with and without the activated carbon material to laminate 1¼ inch oil-resistant (a foam of copolymers of butadiene-1,3 and acrylonitrile containing activated carbon) flatstock and to show the effect of the continuous cement bond on the wicking of oil from one layer to the other. Lamination was carried out by applying the cement to the surfaces of rectangular rubber layers of copolymers of butadiene-1,3 and acrylonitrile flatstock, pressing the cemented surfaces together and curing the rubber cement.

The oil permeability of this laminating cement was tested by immersing these lubricator-type flatstock laminates to a depth of one inch in a dish of lubricating oil for a period of twenty-four hours at 75° F. The copolymers of butadiene-1,3 and acrylonitrile stock cemented with neoprene (prepared per the above formula) cement not containing activated carbon wicked only to the cemented barrier. However, the copolymers of butadiene-1,3 and acrylonitrile stock cemented with a neoprene (prepared per the above formula) cement containing activated carbon showed that the oil will pass through the cement barrier to the area above (more than ⅜ inch above the cement layer in the first 30 minutes) without difficulty.

Neoprene cements (prepared per the above recipe) with both 10 and 25 parts by weight of activated carbon per 100 parts of rubber component were employed to bond foam flatstocks of neoprene to copolymers of butadiene-1,3 and acrylonitrile (with and without activated carbon). Again, the height of oil migration above the cement line of the laminate, when immersed in a tray of oil to a depth of one inch, was used as the criterion for wicking. The oil passed through the cement barrier of the activated carbon containing cements to a height of more than ⅜ inch in the first 30 minutes. These amounts of activated carbon represent a suitable range, as lesser amounts thereof showed little effect and greater amounts gave poorer adhesion.

Like results were obtained with neoprene foam flatstock (with and without activated carbon) bonded with both neoprene and copolymers of butadiene-1,3 and acrylonitrile adhesive cement.

*Example II*

Natural rubber cement:                  Parts by weight
- Smoked sheet _____ 100
- Benzothiazyl disulfide _____ 0.6
- Calcium carbonate _____ 10.0
- Rosin _____ 10.0
- Sulfur _____ 2.0
- Activated carbon _____ 25.0

This cement was tested in the same manner as in Example I except for the use of 1¼ inch foam rubber made from a blend of butadiene:styrene rubber and natural rubber latices as the laminated layers. These layers were laminated with the natural rubber cement both with and without activated carbon. Since both the flatstock and cement would swell and deteriorate in oil, a water solution of red dye was used in place of the oil of Example I to trace the solution migration through the cement barrier. As before, the liquid migration stopped at the cement barrier when the cement without activated carbon contained therein was employed. By the addition of activated carbon to the same cement, the solution could be traced well up into the top layer of the test piece. Such laminates can be used in paint applicators, stamp pads, etc.

Although wicking can be promoted between two pieces of rubber flatstock by cement printing, web spraying or other means of making a discontinuous coating, my method relates to a means for obtaining a continuous cement coating between said layers while at the same time allowing a liquid or gas to pass through the cement barrier.

There is nothing unusual about the stability or viscosity of a cement to which activated carbon material has been added. Such cement may be applied by any usual method. I have applied the cement used in my experiments with both a scraper blade and a brush but, with the correct viscosity and solids adjustment, a spraying technique or roller coating readily can be employed. The drying time was determined by the familiar touch method.

*Example III*

In preparing journal pad lubricators, or more generally foam laminates, the vulcanizable cement compositions usually contain curing agents. However, activated carbon may be used in vulcanizable cements which do not require vulcanization to be effective cements. In these cements, I prefer to use neoprene-type rubbers, such as those which are marketed by E. I. du Pont de Nemours & Co., Inc. These rubbers are recognized as quick-setting and are sometimes called "high freeze rubbers." The use of these rubbers in unvulcanized cements is well recognized. It should be noted that both types can be vulcanized, if desired. These neoprene-type rubbers are described in detail on pages 87–92 of a publication entitled "The Neoprenes-Principles of Compounding and Processing," by Neil L. Cotton, published by the Rubber Chemicals Division, E. I. du Pont de Nemours & Co., Inc., Wilmington, Delaware.

I have added 10 to 15 parts of two neoprene rubbers, respectively, to a solvent mixture of 50 parts of acetone and 50 parts of hexane. To this I added 10 to 15 parts by weight of activated carbon. The cement was then applied in a conventional manner as previously described in Example I, and the copolymers of butadiene-1,3 and acrylonitrile foam slabs were plied when the adhesive film was tacky. Again, when immersed to a depth of one inch in lubricating oil, the oil passed through the cement layer to a point more than ⅜ inch above said layer in the first 30 minutes.

*Example IV*

Samples were made to determine the effect incorporation of activated carbon might have on the ultimate adhesion of a self-curing rubber cement.

Although my improved cement was designed for use primarily with foam rubber, these samples were made by cementing pieces of cured gum rubber stock with a self-curing rubber cement containing varying amounts of activated carbon, thus enabling measurement of bond strength beyond the tensile of foam rubber. The building tack of the cement was affected directly by the activated carbon but tests showed that there was very little effect on the ultimate adhesion when up to 50 parts (based on the total solids of the cement) of carbon was added.

Four samples of self-curing natural rubber cement, containing 10, 25 and 50 parts of activated carbon and a control, were prepared as in Example II. Pieces of gum rubber were bonded with each of these cements and the ultimate adhesion values were obtained with a Scott tester for each laminate. The results are as follows:

Cement samples:            Maximum adhesion in lbs. pull for 1 inch strip
- Control _____ 8.0
- 10 parts activated carbon _____ 6.7
- 25 parts activated carbon _____ 6.5
- 50 parts activated carbon _____ 6.2

Certain advantages are apparent to those skilled in the art when my novel cement compositions are employed to bond or laminate rubber layers which are to be used as journal pad lubricators. However, it will be appreciated that my cement compositions can be utilized in many other instances wherein wicking or migration of fluids through the cement barrier is of particular importance.

Having thus described my invention, what I claim and desire to protect by Letters Patent is:

1. A laminate comprising a plurality of foam rubber layers joined together with a vulcanizable rubber adhesive cement containing at least 10 parts by weight of an activated carbon material in its skeletal state per 100 parts by weight of the rubber component, wherein the cement is cured so as to form continuous cement bonds between the layers, which bonds allow and promote the wicking and migration of fluids through their otherwise impermeable barriers.

2. A laminate comprising a plurality of oil-resistant foam rubber layers, said rubber layers being selected from the group consisting of homopolymers of chloro-2-butadiene-1,3 and copolymers of butadiene-1,3 with acrylonitrile, joined together with a vulcanizable rubber adhesive cement containing at least 10 parts by weight of an activated carbon material in its skeletal state per 100 parts by weight of the rubber component, wherein the vulcanizable rubber cement is cured so as to form continuous bonds between the layers, which bonds allow and promote the wicking and migration of fluids through their otherwise impermeable barriers.

3. A method of laminating a plurality of foam rubber layers comprising applying a vulcanizable rubber adhesive cement containing at least 10 parts by weight of an activated carbon material in its skeletal state per hundred parts by weight of the rubber component of said cement to the surfaces of the layers, joining said layers together, and curing the cement so as to form continuous cement bonds between the layers which bonds allow and promote the wicking and migration of fluids through their otherwise impermeable barriers.

4. A method as in claim 3, wherein the rubber component of the adhesive cement includes natural rubber.

5. A method as in claim 3, wherein the rubber component of the adhesive cement includes homopolymers of chloro-2-butadiene-1,3.

6. A method as in claim 3, wherein the rubber component of the adhesive cement includes copolymers of butadiene-1,3 with acrylonitrile.

7. A method as in claim 3, wherein the rubber component of the adhesive cement includes copolymers of butadiene-1,3 with styrene.

8. A method of laminating a plurality of oil resistant foam rubber layers, said rubber being selected from the group consisting of homopolymers of chloro-2-butadiene-1,3 and copolymers of butadiene-1,3 with acrylonitrile, comprising applying a vulcanizable rubber adhesive cement containing at least 10 parts by weight of an activated carbon material in its skeletal state per hundred parts by weight of the rubber component of said cement to the surfaces of the rubber layers, joining said layers together, and curing the cement so as to form continuous cement bonds between the layers which bonds allow and promote the migration of oil through their otherwise impermeable barriers.

References Cited by the Examiner

UNITED STATES PATENTS

| | | | |
|---|---|---|---|
| 1,522,954 | 1/25 | Hamister et al. | 260—763 |
| 2,426,430 | 8/47 | Binns | 260—723 |
| 2,518,454 | 8/50 | Elliott | 260—2.5 |
| 2,628,928 | 2/53 | Cadous | 154—48 |
| 2,640,035 | 5/53 | Brown et al. | 260—41.5 |
| 2,752,979 | 7/56 | Knill et al. | 156—97 |

FOREIGN PATENTS 423,586   2/35   Great Britain.

EARL M. BERGERT, *Primary Examiner.*

CARL F. KRAFFT, *Examiner.*